(12) United States Patent
Eguchi et al.

(10) Patent No.: US 10,158,799 B2
(45) Date of Patent: Dec. 18, 2018

(54) IMAGING APPARATUS

(71) Applicant: Panasonic Intellectual Property Management Co., Ltd., Osaka (JP)

(72) Inventors: Kazuhiro Eguchi, Fukuoka (JP); Ryuuichi Yatsunami, Fukuoka (JP); Hideki Tatematsu, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 64 days.

(21) Appl. No.: 15/337,877

(22) Filed: Oct. 28, 2016

(65) Prior Publication Data

US 2017/0048457 A1     Feb. 16, 2017

Related U.S. Application Data

(63) Continuation of application No. PCT/JP2015/002507, filed on May 19, 2015.

(30) Foreign Application Priority Data

May 27, 2014   (JP) ................................ 2014-108984

(51) Int. Cl.
   *H04N 5/232*   (2006.01)
   *G06K 9/00*    (2006.01)
   (Continued)

(52) U.S. Cl.
   CPC ....... *H04N 5/23241* (2013.01); *G03B 17/561* (2013.01); *G06K 9/00771* (2013.01);
   (Continued)

(58) Field of Classification Search
   CPC .......... H04N 5/23241; H04N 5/23203; H04N 5/23209; H04N 5/2251; H01F 38/14;
   (Continued)

(56) References Cited

U.S. PATENT DOCUMENTS 5,289,091 A     2/1994  Wada
2003/0210904 A1*  11/2003  Tatsumi ................. G03B 17/24
                                                  396/310

FOREIGN PATENT DOCUMENTS

JP       05-68186 A     3/1993
JP    2007-006023 A     1/2007
(Continued)

OTHER PUBLICATIONS

International Search Report dated Jul. 14, 2015, for corresponding International Application No. PCT/JP2015/002507, 4 pages.

*Primary Examiner* — Yogesh Aggarwal
(74) *Attorney, Agent, or Firm* — Seed IP Law Group LLP

(57) ABSTRACT

An imaging apparatus of the disclosure includes a base that has a power transmitter for transmitting power wirelessly; and a movable unit that has a power receiver for receiving power wirelessly from the power transmitter, an imager operating on the basis of power received by the power receiver, and a first communicator transmitting image information acquired by the imager wirelessly. The movable unit is movable relative to the base. According to the disclosure, it is possible to improve reliability of transmission and reception of a signal and power, and it is possible to alleviate deficiency due to limitation on the number of operation times caused by a mechanical contact.

14 Claims, 10 Drawing Sheets

(51) Int. Cl.
　　　　*H04N 5/225*　　　(2006.01)
　　　　*H02J 7/02*　　　　(2016.01)
　　　　*G03B 17/56*　　　(2006.01)
　　　　*H01F 38/14*　　　(2006.01)
　　　　*H02J 50/10*　　　(2016.01)

(52) U.S. Cl.
　　　CPC .............. *H01F 38/14* (2013.01); *H02J 7/025* (2013.01); *H02J 50/10* (2016.02); *H04N 5/2251* (2013.01); *H04N 5/23203* (2013.01); *H04N 5/23209* (2013.01); *G03B 2206/00* (2013.01)

(58) Field of Classification Search
　　　CPC ........ H02J 50/10; H02J 7/025; G03B 17/561; G03B 2206/00; G06K 9/00771
　　　USPC .................................................. 348/370–374
　　　See application file for complete search history.

(56) References Cited

FOREIGN PATENT DOCUMENTS

| | | | |
|---|---|---|---|
| JP | 2009-009796 A | | 1/2009 |
| JP | 2009-194527 A | | 8/2009 |
| JP | 2009194527 A | * | 8/2009 |
| JP | 2009-200750 A | | 9/2009 |
| JP | 2011-239416 A | | 11/2011 |

* cited by examiner

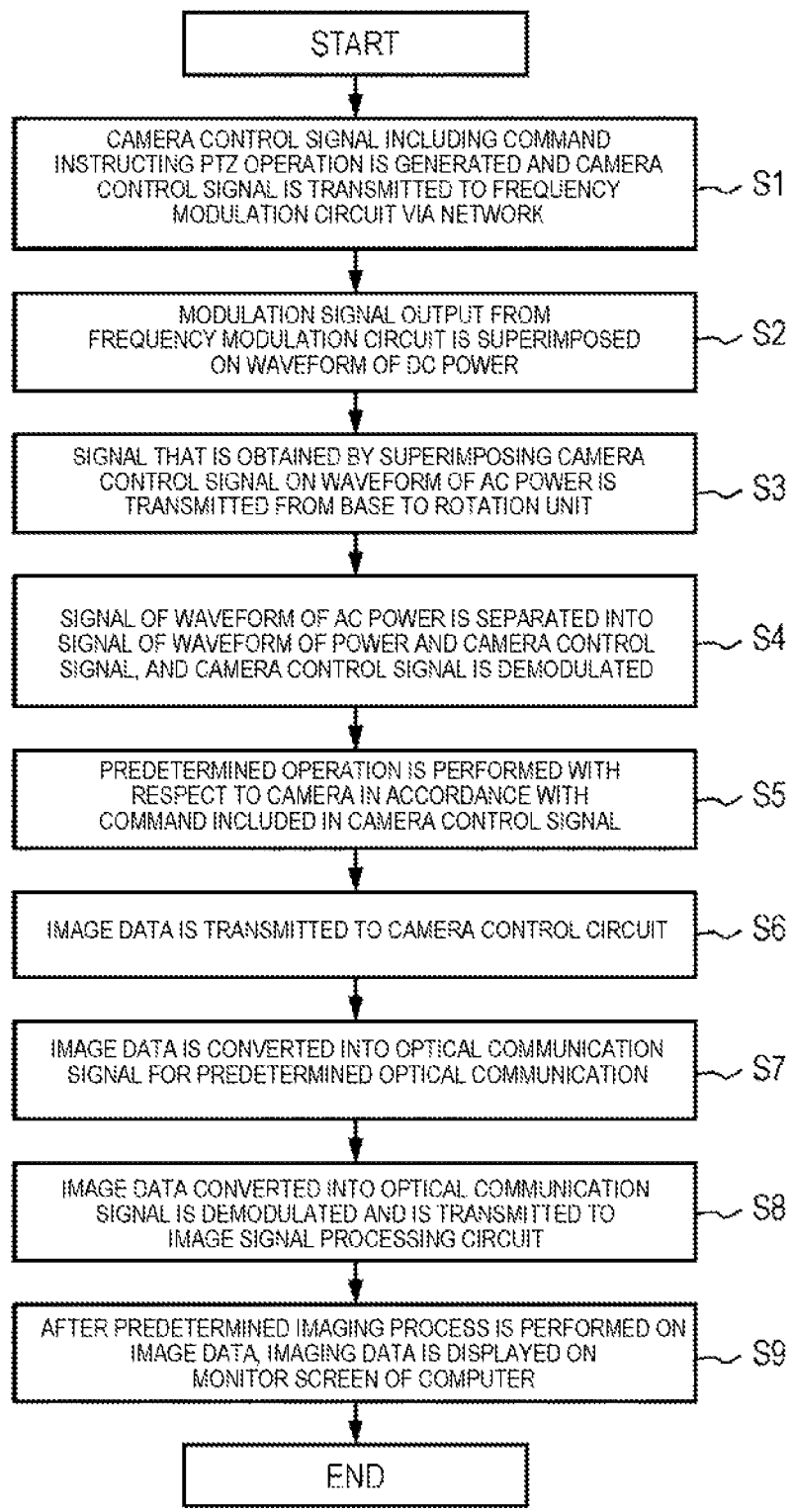

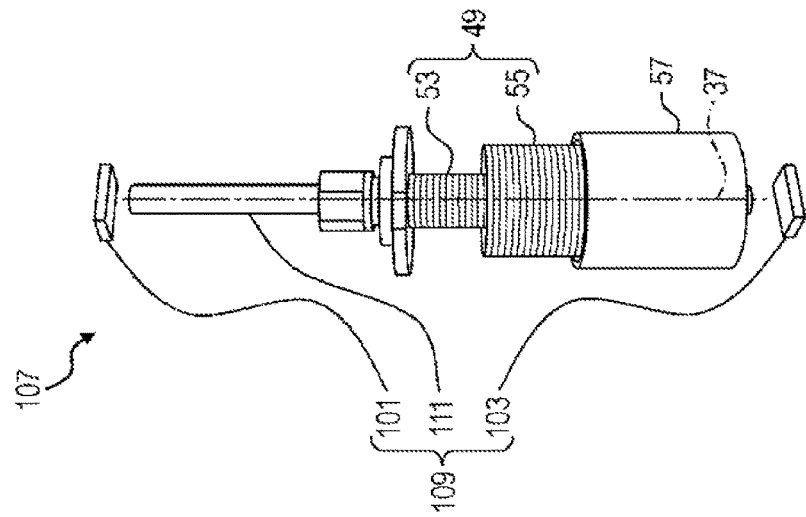
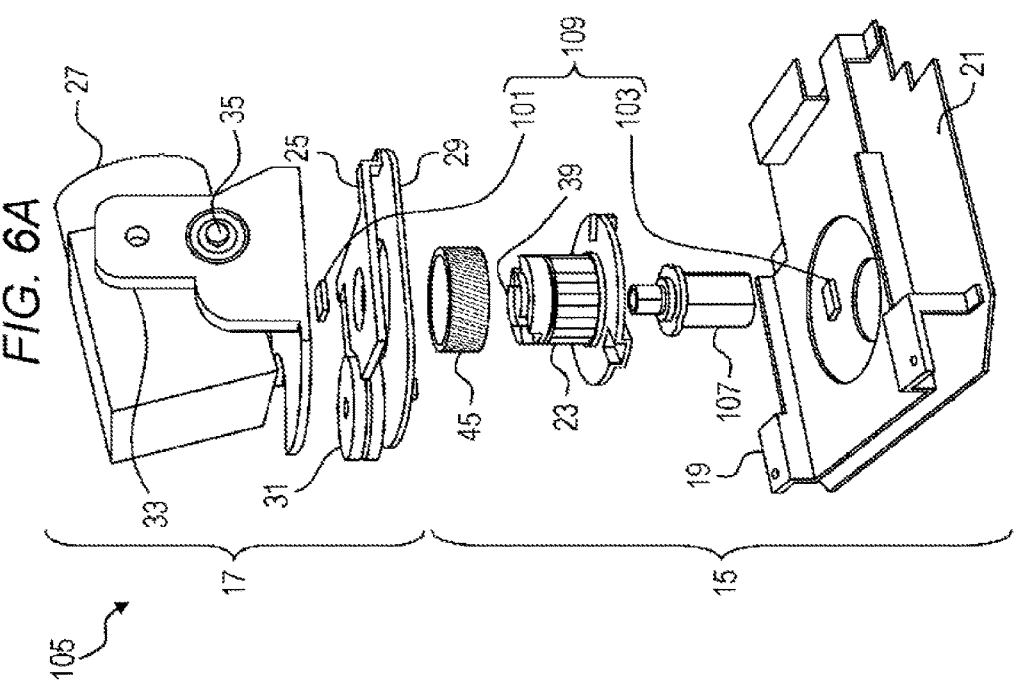

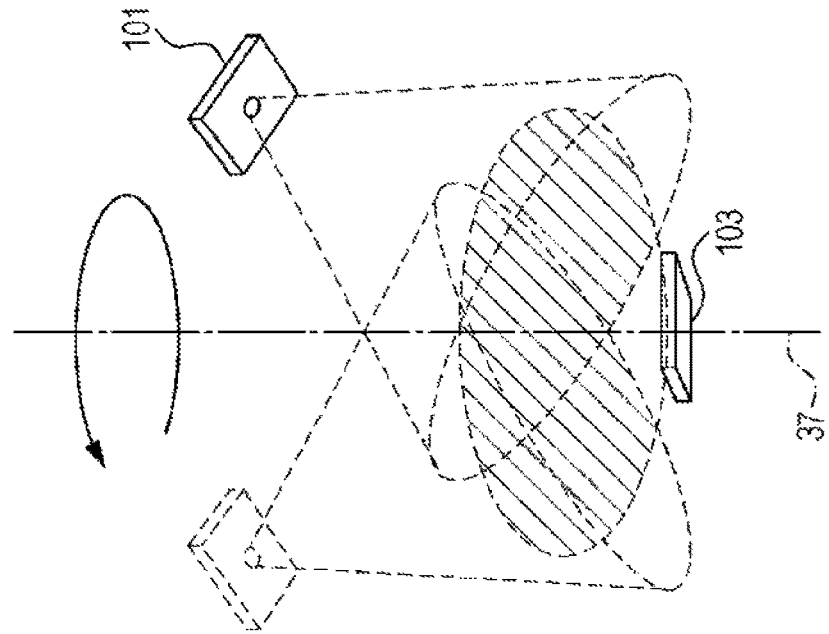
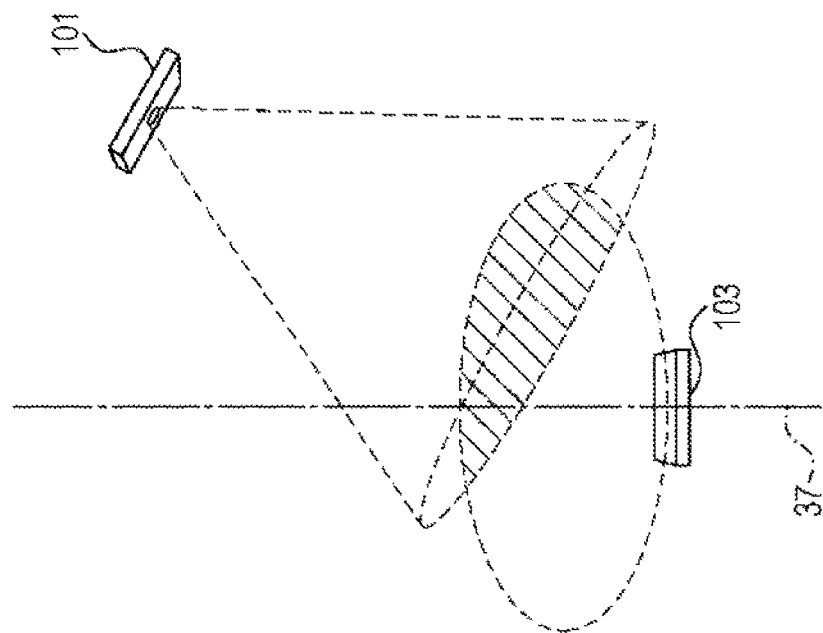

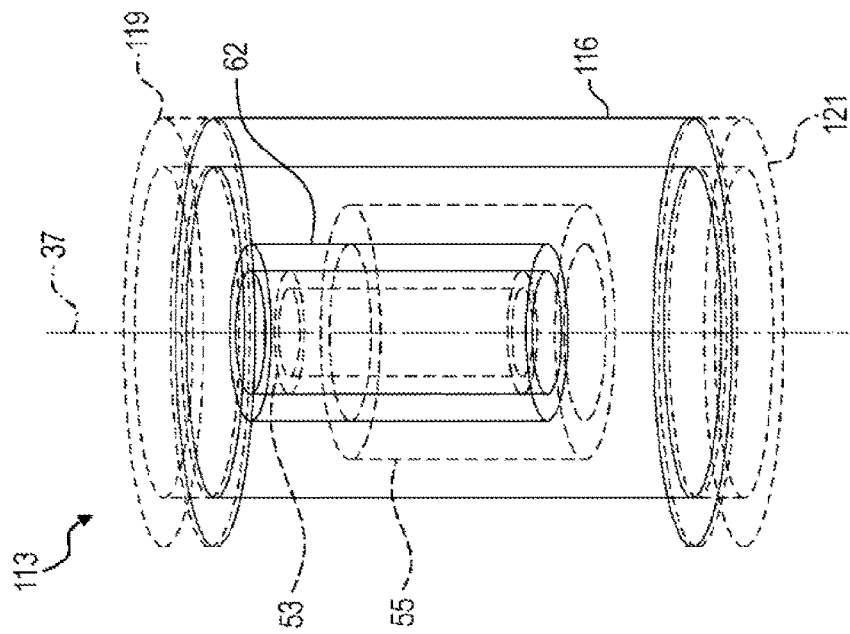
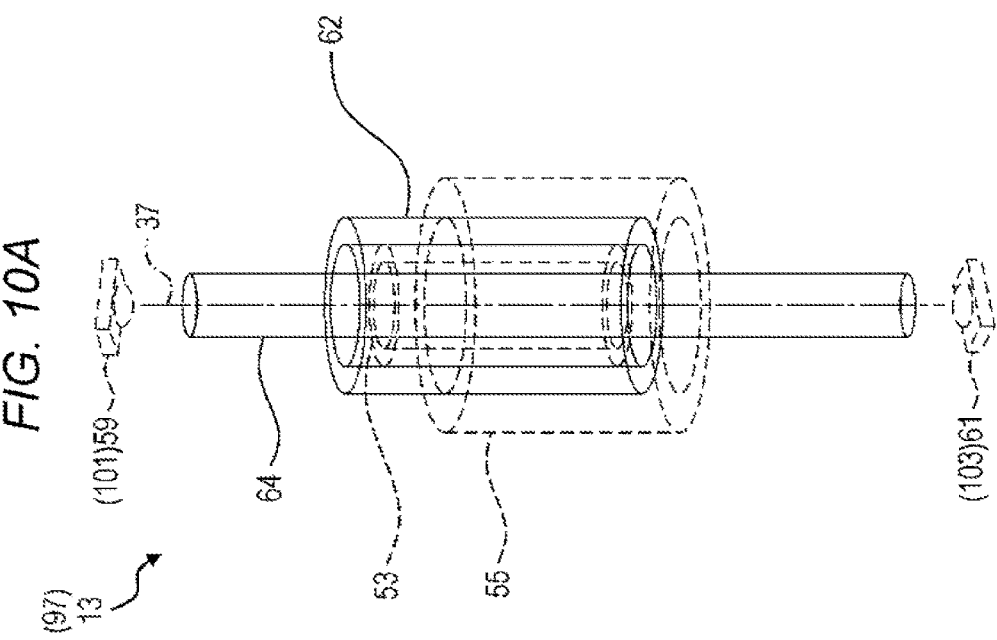

IMAGING APPARATUS

CROSS REFERENCE TO RELATED APPLICATIONS

This application is a continuation application based on the PCT international application No. PCT/JP2015/002507 filed on May 19, 2015, which claims the benefit of foreign priority of Japanese patent application No. 2014-108984 filed on May 27, 2014, the contents all of which are incorporated herein by reference.

TECHNICAL FIELD

The present disclosure relates to an imaging apparatus having a rotation drive mechanism.

RELATED ART

In the related art, as an example of an imaging apparatus using a rotation drive mechanism, a monitoring camera which continues to pan in a constant panning range at a predetermined speed is known (for example, see PTL 1). In the monitoring camera disclosed in PTL 1, a limit switch detects both end sides in a panning direction and a switching device receiving a signal of the limit switch switches a rotation direction of a motor.

On the other hand, since the monitoring camera frequently performs a rotation operation for monitoring, the monitoring camera may be able to perform endless panning. In the monitoring camera of such a type, a slip ring is used such that a limitation of a camera rotation angle is not regulated by winding of a harness. The slip ring includes rotating terminals and electric contacts. The rotating terminals are fixed on an outer periphery of a rotation shaft and are provided in a plurality of stages, for example, substantially 12 stages in a direction along an axis of the rotation shaft. The electric contacts are provided in a base that is not rotated and are in contact with each rotating terminal. Therefore, in the monitoring camera, it is possible to transmit and receive the image signal and the like, and supply power between the base and the rotation unit while realizing endless panning via the slip ring.

However, since the slip ring has a complex structure including a number of mechanical contacts, the problem is that there is a limit in the number of operation times. In addition, the slip ring is expensive because a plurality of rotating terminals including smooth electric contact surfaces having wear resistance have to be fixed with high precision along the rotation shaft.

CITATION LIST

Patent Literature

PTL 1: Japanese Patent Unexamined Publication No. 5-68186

SUMMARY

An imaging apparatus of the disclosure includes a base that has a power transmitter for transmitting power wirelessly; and a movable unit that has a power receiver for receiving power wirelessly from the power transmitter, an imager operating on the basis of power received by the power receiver, and a first communicator transmitting image information acquired by the imager wirelessly. The movable unit is movable relative to the base. According to the disclosure, it is possible to improve reliability of transmission and reception of a signal and power, and it is possible to alleviate deficiency due to limitation on the number of operation times caused by a mechanical contact.

BRIEF DESCRIPTION OF DRAWINGS

FIG. 4 is a flow chart describing an operation of the monitoring camera of the first exemplary embodiment.

FIG. 6A is an exploded perspective view of a monitoring camera of a modification example of the second exemplary embodiment.

FIG. 6B is an exploded perspective view of a transmission module illustrated in FIG. 6A.

FIG. 9A is an explanatory view illustrating a modification example in which the rotation-side millimeter-wave transmission and reception device of directivity is shifted from a rotational center.

FIG. 9B is an explanatory view of an operation of FIG. 9A.

FIG. 10A is an explanatory view describing a transmission shaft, a power transmission virtual cylinder as an example of a virtual cylinder, and a signal transmission virtual column as an example of a virtual column.

FIG. 10B is an explanatory view describing the transmission shaft, the virtual cylinder, the power transmission virtual cylinder, and the signal transmission virtual cylinder as an example of the virtual cylinder.

DESCRIPTION OF EMBODIMENTS

Hereinafter, each exemplary embodiment of an imaging apparatus according to the disclosure will be described with reference to the drawings. As the imaging apparatus of each exemplary embodiment, a monitoring camera is described as an example.

First Exemplary Embodiment

Figure 1:
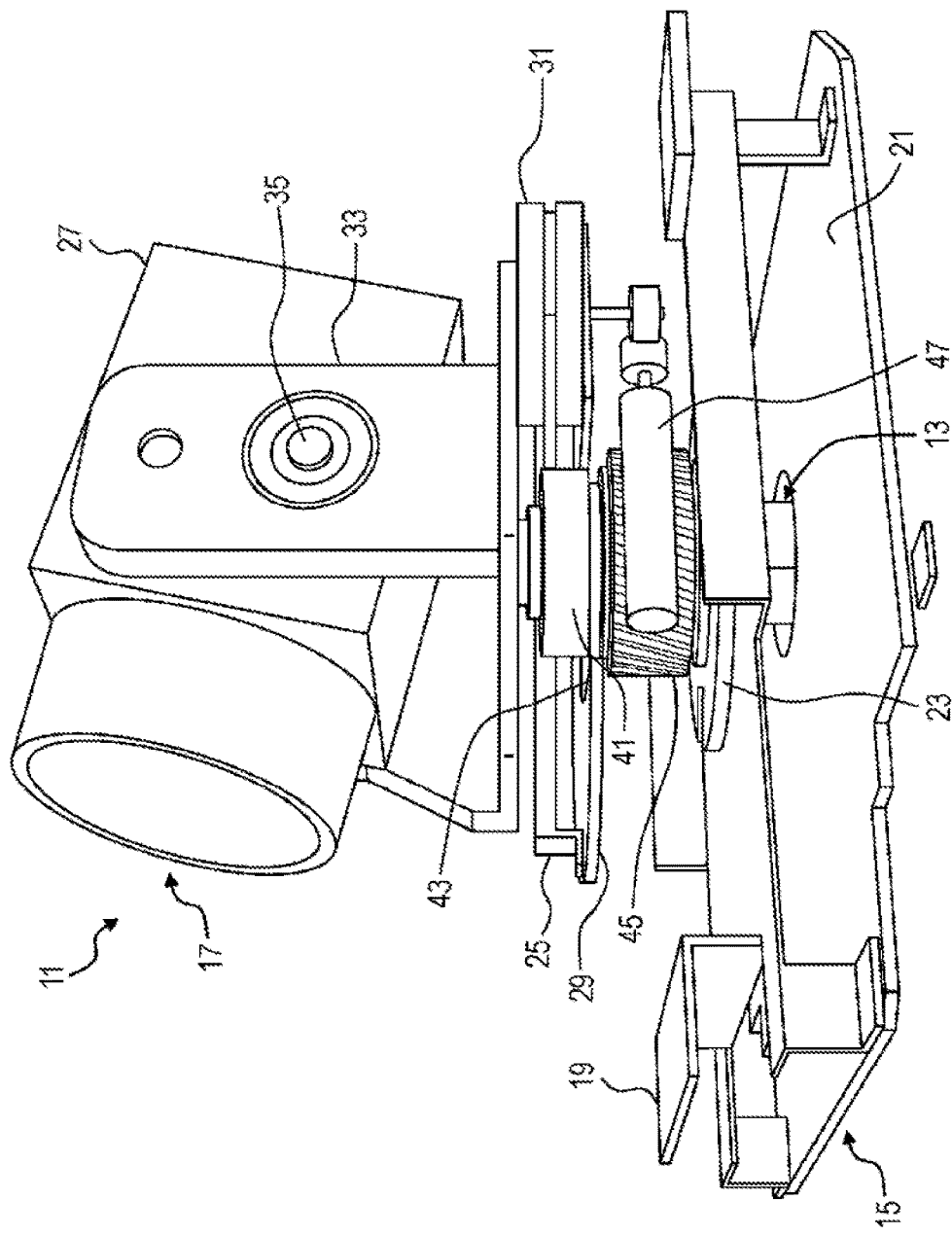
FIG. 1 is a perspective view of a main portion viewed through a part of a monitoring camera of a first exemplary embodiment.
Figure 2B:
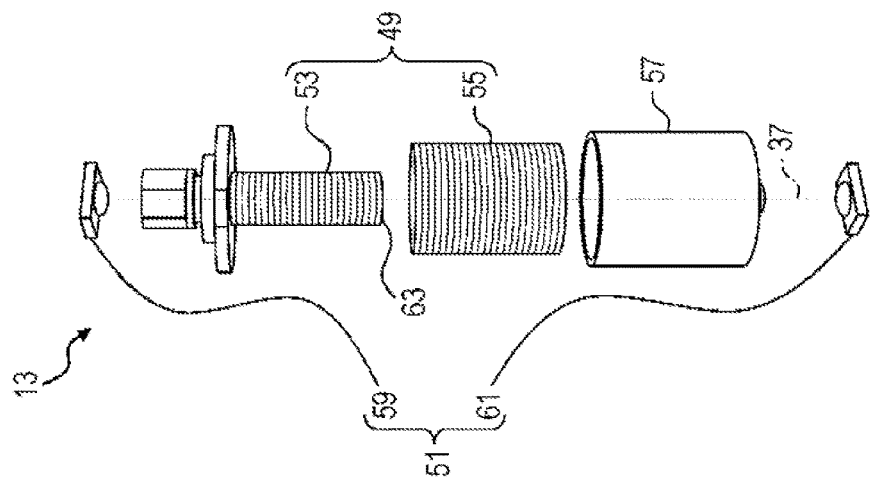
FIG. 2B is an exploded perspective view of a transmission module illustrated in FIG. 2A.
Figure 2A:
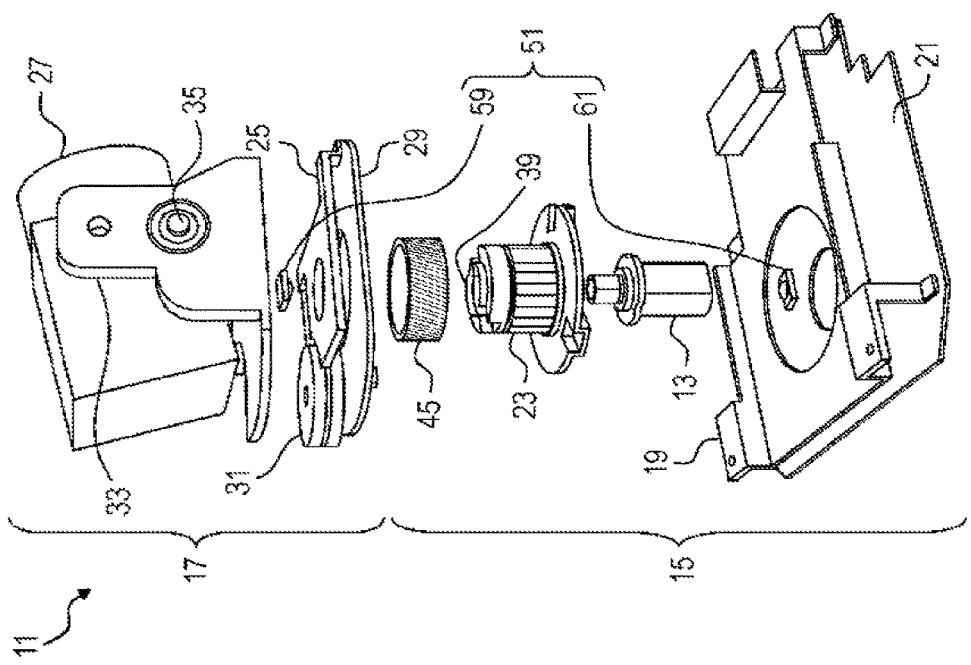
FIG. 2A is an exploded perspective view of the monitoring camera illustrated in FIG. 1.

FIG. 1 is a perspective view of a main portion viewed through a part of monitoring camera 11 of a first exemplary embodiment. FIG. 2A is an exploded perspective view of monitoring camera 11 illustrated in FIG. 1. FIG. 2B is an exploded perspective view of transmission module 13 illustrated in FIG. 2A.

Monitoring camera 11 of the exemplary embodiment is configured to include base 15, rotation unit 17 as an example of a movable unit, and transmission movable 13. Rotation unit 17 has a configuration to be movable, for example, a rotation operation is performed with respect to base 15.

Base 15 has a power transmitter (for example, power transmission coil 55) for transmitting power wirelessly. Base 15 has base bracket 19 which is formed of a sheet metal material, and the like. Base bracket 19 is fixed to a ceiling of a building that is a fixed body, a support pole for monitoring camera 11, and the like. Base-side substrate 21 and fixed shaft 23 are fixed to base bracket 19. In addition, base-side fixed components (for example, power transmission coil 55 and optical receiver 61) in transmission module 13 are fixed to base bracket 19.

Rotation unit 17 that is an example of the movable unit has a power receiver (for example, power receiving coil 53) for receiving power from the power transmitter wirelessly, an imager operating on the basis of power received by the power receiver, and a first communicator for transmitting image information (for example, image data) acquired by the imager wirelessly. Rotation unit 17 is rotatably supported on fixed shaft 23 of base 15. Rotation unit 17 includes camera bracket 25. Camera 27 that is an example of the imager, rotation unit-side substrate 29, and motor 31 are fixed to camera bracket 25. In addition, rotation unit-side fixed components (for example, power receiving coil 53 and optical transmitter 59) in transmission module 13 are fixed to camera bracket 25. In rotation unit 17, camera bracket 25 is rotatably supported on fixed shaft 23. That is, camera bracket 25 is rotated with respect to fixed shaft 23 and thereby camera 27 is panned. In addition, power received by the power receiver of rotation unit 17 is supplied to camera 27 as the imager via a cable (not illustrated). Camera 27 has a configuration to be movable, for example, the rotation operation is performed with respect to base 15 in conjunction with the power receiver. Therefore, power received by the power receiver of rotation unit 17 is supplied to camera 27 via the cable and thereby camera 27 can be operated by power transmitted in a non-contact manner as a power source, for example, without requiring an external power source.

A tilt rotation motor (not illustrated) for rotating camera 27 around arm spindle 35 of camera arm 33 in a tilt direction (vertical direction) is provided in camera 27 in addition to motor 31 used to pan, that is, rotate camera 27 in a pan direction (horizontal direction). In addition, a zoom motor (not illustrated) for moving a lens is also provided in camera 27. Camera 27 is able to perform pan, tilt, and zoom operations (PTZ operations) by the plurality of motors.

Transmission module 13 that is an example of a transmitter is provided in monitoring camera 11 through base 15 and rotation unit 17. One side of transmission module 13 is connected to base 15 and the other side of transmission module 13 is connected to rotation unit 17. That is, at least optical receiver 61 (also including base-side millimeter-wave transmission and reception device 103 and base-side slot antenna 121) of transmission module 13 is included in base 15 and at least optical transmitter 59 (also including rotation-side millimeter-wave transmission and reception device 101 and rotation-side slot antenna 119) of transmission module 13 is included in rotation unit 17. Transmission module 13 transmits a signal of data transmitted and received by camera 27, and power fed to camera 27 in a non-contact manner using a transmission shaft that is the same as the rotation shaft of rotation unit 17. In other words, transmission module 13 transmits the signal and power in a non-contact manner using at least one of between both ends of axis 37 passing through the rotation shaft of rotation unit 17 and between a pair of concentric circles around axis 37 as a transmitting path.

In monitoring camera 11 of the exemplary embodiment, fixed shaft 23 in which hollow portion 39 including a rotational center is formed is fixed to base 15. Transmission module 13 is inserted into hollow portion 39. Engaging piece 43 is engaged with circumferential groove 41 formed in fixed shaft 23 and thereby the movement of camera bracket 25 is regulated in a direction along axis 37 of fixed shaft 23 and is rotatably supported to fixed shaft 23. Worm wheel 45 is coaxially fixed to an outer periphery of fixed shaft 23. Worm gear 47 meshing with worm wheel 45 is fixed to a driving shaft of motor 31. Therefore, if motor 31 is actuated and worm gear 47 of the driving shaft is rotated, while worm gear 47 itself rotated, worm gear 47 turns around an outer periphery of worm wheel 45 while rotating. Therefore, rotation unit 17 having camera 27 pans around fixed shaft 23 with respect to base 15.

In monitoring camera 11, transmission module 13 has power transmitter 49 of which axis 37 passes through the transmission shaft and which causes a transmitting path to be formed between power transmission coil 55 that is electrically connected to base 15 and power receiving coil 53 that is electrically connected to rotation unit 17; a first communicator (for example, optical transmitter 59) that is electrically connected to rotation unit 17; and a second communicator (for example, optical receiver 61) that is electrically connected to base 15. In other words, transmission module 13 includes power transmitter 49 that causes the transmitting path to be formed between an inner peripheral surface and an outer peripheral surface of a virtual cylinder of which a central axis is axis 37; and signal transmitter 51 that causes the transmitting path to be formed between both end surfaces of a virtual column of which a central axis is axis 37. The second communicator receives wirelessly image information (for example, image data) transported from the first communicator wirelessly. At least one of the first communicator and the second communicator may be disposed on the rotation shaft of rotation unit 17, and both the first communicator and the second communicator may be disposed on the rotation shaft of rotation unit 17.

FIG. 10A is an explanatory view describing the transmission shaft, power transmission virtual cylinder 62 as an example of the virtual cylinder, and signal transmission virtual column 64 as an example of the virtual column. In FIG. 10A, in order to facilitate the description of power transmission virtual cylinder 62 and signal transmission virtual column 64, portions that are actually present are indicated by dashed lines and portions that are virtually present are indicated by solid lines.

In the exemplary embodiment, in transmission module 13 passing through hollow portion 39 of fixed shaft 23, the transmitting path of power transmitter 49 is formed between the inner peripheral surface and the outer peripheral surface of power transmission virtual cylinder 62 of which the central axis (transmission axis) is axis 37. Power is transmitted and received by the transmitting path in a non-contact manner. More specifically, the inner peripheral surface of power transmission virtual cylinder 62 is the outer peripheral surface of power receiving coil 53. The outer peripheral surface of power transmission virtual cylinder 62 is the inner peripheral surface of power transmission coil 55. That is, power transmission virtual cylinder 62 becomes a space between the outer peripheral surface of power receiving coil 53 and the inner peripheral surface of power transmission coil 55. Power transmission coil 55 and power receiving coil 53 perform transmission and reception of power in a non-contact manner via the space (the inner peripheral surface and the outer peripheral surface of power transmission virtual cylinder 62). Power transmission coil 55 is fixed to base bracket 19. The outer periphery of power transmission coil 55 is covered by power transmission coil cover 57. Power receiving coil 53 is fixed to camera bracket 25.

On the other hand, in monitoring camera 11, signal transmitter 51 in transmission module 13 includes optical transmitter 59 that is disposed on one end surface of signal transmission virtual column 64 and is fixed to rotation unit 17; and optical receiver 61 that is disposed on the other end surface of the signal transmission virtual column and is fixed to base 15. Signal transmitter 51 causes the transmitting path to be formed between both end surfaces of signal transmission virtual column 64 of which the central axis is axis 37. More specifically, signal transmission virtual column 64 becomes hollow portion 63 through a core of power receiving coil 53. Transmission module 13 causes hollow portion 63 to be the transmitting path of an optical signal or a high-frequency signal (for example, microwave and millimeter wave). In the exemplary embodiment, hollow portion 63 of power receiving coil 53 is the transmitting path of optical transmitter 59 and optical receiver 61 in signal transmitter 51.

Figure 3:
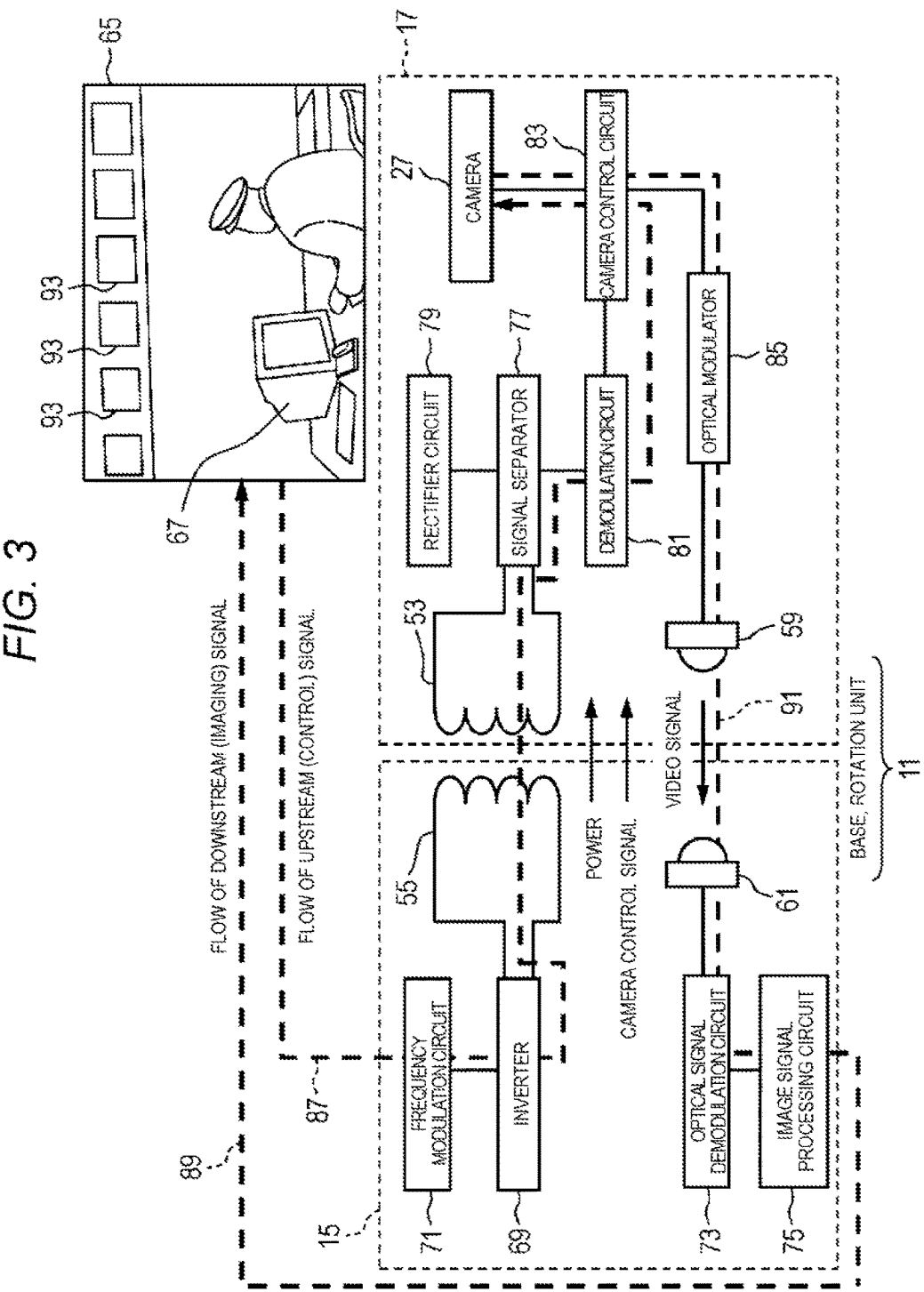
FIG. 3 is a block diagram illustrating an internal configuration of the monitoring camera of the first exemplary embodiment.

FIG. 3 is a block diagram illustrating an internal configuration of monitoring camera 11 of the first exemplary embodiment.

Monitoring camera 11 is connected to, for example, computer 67 of monitoring room 65 via a network. Power transmission coil 55, inverter 69, frequency modulation circuit 71, optical receiver 61, optical signal demodulation circuit 73, and image signal processing circuit 75 are provided in base 15 of monitoring camera 11. Power receiving coil 53, signal separator 77, rectifier circuit 79, demodulation circuit 81, camera control circuit 83, camera 27, optical modulator 85, and optical transmitter 59 are provided in rotation unit 17 of monitoring camera 11.

Frequency modulation circuit 71 inputs camera control signal 87 from computer 67, performs frequency modulation using a predetermined frequency modulation system (for example, Frequency Shift Keying: FSK) with respect to camera control signal 87, and outputs a modulation signal to inverter 69. The modulation system in frequency modulation circuit 71 is not limited to the frequency modulation (FSK) and, for example, may also use Amplitude Shift Keying (ASK) in addition thereto.

DC power from DC power supply (not illustrated) or DC power that is obtained by converting from commercial power supply (not illustrated) to DC is supplied to inverter 69 that is an example of a superimposing unit. Inverter 69 superimposes the modulation signal (that is, frequency modulation signal of camera control signal 87) output from frequency modulation circuit 71 on a waveform of DC power. Inverter 69 converts a signal of a waveform on which DC power and the frequency modulation signal of camera control signal 87 are superimposed into a signal of a waveform of AC power, and transmits the signal to power transmission coil 55. That is, the superimposing unit such as inverter 69 for superimposing camera control signal 87 that is control information for controlling camera 27 as the imager on power is provided in base 15. Therefore, even in a case where it is difficult to perform communication in both directions, it is possible to substantially perform communication in both directions by superimposing a signal on power during power transmission.

Power transmission coil 55 is connected to a power transmission circuit (not illustrated) of base-side substrate 21. Power transmission coil 55 is configured by winding a conductor around axis 37. In the exemplary embodiment, the central axis of power transmission coil 55 matches axis 37, but may not necessarily match axis 37. In addition, power transmission coil 55 includes power receiving coil 53. That is, a diameter of power transmission coil 55 is greater than a diameter of power receiving coil 53. In transmission module 13, power transmission coil 55 supplies power to rotation unit 17 via power receiving coil 53 in a non-contact manner.

Optical receiver 61 that is an example of the second communicator is connected to optical signal demodulation circuit 73 of base-side substrate 21, receives (receives light) an optical communication signal (imaging signal 91) from optical transmitter 59, which is modulated from image data 89, and outputs the optical communication signal to optical signal demodulation circuit 73.

Optical signal demodulation circuit 73 is connected to image signal processing circuit 75 of base-side substrate 21, demodulates the optical communication signal transmitted from optical receiver 61 to image data 89, and outputs image data 89 to image signal processing circuit 75.

Image signal processing circuit 75 is connected to the network (not illustrated) and generates the image data indicated in monitor screen 93 by performing a predetermined imaging process with respect to image data 89 that is demodulated by optical signal demodulation circuit 73.

Power receiving coil 53 is connected to signal separator 77 of rotation unit-side substrate 29 and receives power (AC power) fed by electromagnetic induction between power receiving coil 53 and power transmission coil 55 provided in base 15. A signal of a waveform of received AC power is input into signal separator 77. Power receiving coil 53 is configured by winding a conductor around axis 37. In the exemplary embodiment, the central axis of power receiving coil 53 matches axis 37, but may not necessarily match axis 37. In addition, power receiving coil 53 is included in power transmission coil 55 and is positioned in the hollow portion of power transmission coil 55. That is, the diameter of power receiving coil 53 is less than the diameter of power transmission coil 55.

Signal separator 77 is connected to demodulation circuit 81 and rectifier circuit 79, and separates the signal of the waveform of AC power into the signal of the waveform of power and camera control signal 87 (that is, the frequency modulation signal generated by frequency modulation circuit 71). Signal separator 77 outputs the signal of the waveform of power to rectifier circuit 79 and outputs camera control signal 87 to demodulation circuit 81.

Rectifier circuit 79 has an AC-DC converter, rectifies the signal (AC signal) of the waveform of power output from signal separator 77 to a DC signal, and supplies the signal of the waveform of DC power to DC power supply (for example, battery such as storage battery) connected to rectifier circuit 79.

Demodulation circuit 81 is connected to camera control circuit 83, demodulates camera control signal 87 output from signal separator 77, and outputs camera control signal 87 to camera control circuit 83.

Camera control circuit 83 is connected to camera 27 and causes camera 27 to execute an operation in accordance with a command included in camera control signal 87 on the basis of camera control signal 87 that is demodulated by demodulation circuit 81. For example, a command for rotating in a rightward direction, a command for correcting white balance, a command for performing a zooming process (zoom in and zoom out), and the like are included in the command included in camera control signal 87, but the command is not limited to those commands.

Camera 27 that is an example of the imager generates an electric signal corresponding to imaging light from the imaging light received from an optical element (not illustrated) by an imaging element (for example, Charge Coupled Device (CCD) or Complementary Metal Oxide Semiconductor (CMOS)), and outputs the electric signal to camera control circuit 83. Camera control circuit 83 generates image data 89 as the image data by performing a predetermined signal processing on the electric signal output from camera 27. Image data 89 output from camera control circuit 83 is input into optical modulator 85.

Optical modulator 85 is connected to optical transmitter 59 and transmits image data 89 to optical transmitter 59 after image data 89 transmitted from camera control circuit 83 is optically modulated to imaging signal 91 for optical communication.

Optical transmitter 59 that is an example of the first communicator is disposed so as to physically face optical receiver 61. Optical transmitter 59 emits imaging signal 91 transmitted from optical modulator 85 to optical receiver 61. In other words, optical transmitter 59 transmits imaging signal 91 to optical receiver 61 through the transmitting path that is formed in a hollow of the conductor that is wound for configuring power transmission coil 55 or power receiving coil 53.

Next, the operation of monitoring camera 11 of the exemplary embodiment will be described with reference to FIG. 4. FIG. 4 is a flow chart describing the operation of monitoring camera 11 of the first exemplary embodiment. In the description of FIG. 4 refers to FIG. 3 if necessary.

In FIG. 4, in monitoring camera 11, first, camera control signal 87 including a command for instructing the PTZ operation is generated by an operation of a pointing device such as a mouse of a user of computer 67 of monitoring room 65 illustrated in FIG. 3. Camera control signal 87 is transmitted to frequency modulation circuit 71 via the network (step S1).

Frequency modulation circuit 71 performs the frequency modulation of camera control signal 87 and outputs the frequency modulation signal to inverter 69. Inverter 69 superimposes the modulation signal (that is, the frequency modulation signal of camera control signal 87) output from frequency modulation circuit 71 on the waveform of the DC power (step S2).

After step S2, a signal that is formed by superimposing camera control signal 87 on the waveform of the AC power is transmitted from base 15 to rotation unit 17 via power transmission coil 55 and power receiving coil 53 (step 83).

Signal separator 77 separates the signal of the waveform of the AC power into the signal of the waveform of power and camera control signal 87 (that is, the frequency modulation signal generated by frequency modulation circuit 71). Signal separator 77 outputs the signal of the waveform of power to rectifier circuit 79 and outputs camera control signal 87 to demodulation circuit 81.

Demodulation circuit 81 demodulates camera control signal 87 separated by signal separator 77 (step S4). Camera control signal 87 that is demodulated by demodulation circuit 81 is transmitted to rotation unit-side substrate 29. Camera control circuit 83 mounted on rotation unit-side substrate 29 has, for example, a Central Processing Unit (CPU) and acquires camera control signal 87 from demodulation circuit 81. Camera control circuit 83 performs predetermined operations (for example, rotation in the pan direction, rotation in the tilt direction, and zoom) with respect to camera 27 in accordance with a command included in camera control signal 87 (step S5). In addition, camera 27 performs a predetermined imaging process (for example, white balance correction and γ correction) with respect to image data 89, for example, in a case where a command such as the white balance or gamma correction is included in camera control signal 87.

After camera 27 captures an image, image data 89 is delivered to camera control circuit 83 of rotation unit-side substrate 29 (step S6). Camera control circuit 83 outputs image data 89 to optical modulator 85. Optical modulator 85 converts image data 89 into the optical communication signal for predetermined optical communication (step S7).

Image data 89 that is converted into the optical communication signal is transmitted to optical signal demodulation circuit 73 of base 15 via optical transmitter 59 and optical receiver 61 that are in signal transmitter 51 of transmission module 13 (step S8). Optical signal demodulation circuit 73 demodulates image data 89 and transmits image data 89 to image signal processing circuit 75.

Image data 89 transmitted to image signal processing circuit 75 is subjected to be a predetermined imaging process and then is transmitted to computer 67 of monitoring room 65 via the network, and is displayed on monitoring screen 93 (step S9).

Therefore, in monitoring camera 11 of the exemplary embodiment, rotation unit 17 is rotatably supported on base 15. Camera 27 outputting image data 89 is mounted on rotation unit 17. Transmission module 13 is provided in base 15 and rotation unit 17 through both sides. Transmission module 13, which is relatively rotatable around axis 37 through the rotational center of rotation unit 17, is separated into a base 15 side and a rotation unit 17 side.

Transmission module 13 transmits the signal and power using at least one of between both ends of axis 37 and between a pair of concentric circles of which the center is axis 37 as a transmitting path. That is, transmission module 13 is able to transmit the signal and power between base 15 and rotation unit 17 in a non-contact manner. Therefore, unlike the slip ring of the related art, there is no need to accurately fix a plurality of rotation terminals including smooth electric contact surfaces having a wear resistance along the rotation shaft. In addition, a complex structure including a number of mechanical contacts is no longer needed and there is no limit in the number of operation times (pans).

In addition, according to monitoring camera 11, power transmitter 49 forms the transmitting path between the inner peripheral surface and the outer peripheral surface of power transmission virtual cylinder 62 of which the center axis is axis 37. More specifically, the inner peripheral surface of power transmission virtual cylinder 62 can be the outer peripheral surface of power receiving coil 53. The outer peripheral surface of power transmission virtual cylinder 62 can be the inner peripheral surface of power transmission coil 55. That is, power transmission virtual cylinder 62 is a space between the outer peripheral surface of power receiving coil 53 and the inner peripheral surface of power transmission coil 55.

On the other hand, signal transmitter 51 forms the transmitting path between both end surfaces of signal transmission virtual column 64 of which the center axis is axis 37. More specifically, signal transmission virtual column 64 becomes hollow portion 39 passing through the core of power receiving coil 53. Transmission module 13 causes hollow portion 39 to be the transmitting path of the light or the high-frequency wave (for example, millimeter wave). Since transmission module 13 having such a configuration has a simple structure, reliability is high and it is possible to be manufactured at low cost. In addition, in transmission module 13, transmission and reception of signals between the first communicator (for example, optical transmitter 59) and the second communicator (for example, optical receiver 61) are performed via axis 37. Therefore, even in a case where rotation unit 17 is rotated with respect to base 15, a relative positional relationship (for example, distance) between the first communicator and the second communicator is substantially maintained and good communication can be maintained.

According to monitoring camera 11, optical transmitter 59 on one end surface in transmission module 13 is fixed to rotation unit 17. In addition, optical receiver 61 on the other end surface in transmission module 13 is fixed to base 15. An image signal (image data 89) of large capacity is transmitted from camera 27 to base-side substrate 21 in a path of rotation unit-side substrate 29, optical transmitter 59, and optical receiver 61 wirelessly. That is, hollow portion 39 of power transmission coil 55 and power receiving coil 53 is provided in the transmitting path between optical transmitter 59 and optical receiver 61. That is, since the transmitting path is hollow, a portion interfering the optical communication is not present between optical transmitter 59 and optical receiver 61, and the optical communication at high speed is used in the signal transmission (downlink) from camera 27 to base 15.

In signal transmission (uplink) from base 15 to camera 27, in addition to Acknowledgement (ACK) and an operation setting instruction, a degree of a PTZ operation instruction and a data capacity of camera 27 are small. In transmission module 13, since the data capacity that is transmitted and received between the uplink and the downlink is unsymmetrical, no interference occurs in mutual communication because different transmitters are used. In addition, transmission module 13 is not affected by a radio wave leakage to the outside of the device, a radio wave from the outside of the device, and the like together with the uplink and the downlink.

In addition, according to monitoring camera 11, fixed shaft 23 is fixed to base 15. Camera bracket 25 provided in rotation unit 17 is rotatably supported on fixed shaft 23. The movement of camera bracket 25 in a direction along axis 37 is regulated with respect to fixed shaft 23. Therefore, rotation unit 17 is rotatably supported on base 15 without being disengaged from fixed shaft 23 even if rotation unit 17 is disposed on a lower side in the vertical direction. As a device for rotatably supporting rotation unit 17 while regulating the movement in the axial direction, for example, a thrust bearing may be also used.

Worm wheel 45 is coaxially fixed to the outer periphery of fixed shaft 23. Motor 31 for pan is fixed to camera bracket 25. Worm gear 47 is fixed to the driving shaft of pan motor 31 and worm gear 47 mashes with worm wheel 45. If motor 31 is actuated and worm gear 47 fixed to the driving shaft is rotated, worm gear 47 turns along the outer periphery of worm wheel 45 while being rotated. As a result, camera bracket 25 which is integrally fixed with motor 31 is able to be panned around fixed shaft 23.

Hollow portion 39 is formed in fixed shaft 23. Hollow portion 39 includes axis 37 passing through the rotational center of rotation unit 17. Transmission module 13 is inserted into hollow portion 39. Transmission module 13 is inserted into hollow portion 39 thereby being provided through base 15 and rotation unit 17. Transmission module 13 is separated into the base side and the rotation unit side which are relatively rotatable around axis 37 passing through the rotational center of rotation unit 17. Therefore, transmission module 13 is able to transmit a signal and power between both ends of axis 37 described above and between a pair of concentric circles of which the center is axis 37 in a non-contact manner.

Therefore, in monitoring camera 11 of the exemplary embodiment, it is possible to reduce a current cost and improve transmission reliability of a signal and power. Furthermore, it is possible to overcome limitations of the number of operation times due to mechanical contacts.

Second Exemplary Embodiment

Next, monitoring camera 95 according to a second exemplary embodiment will be described.

Figure 5B:
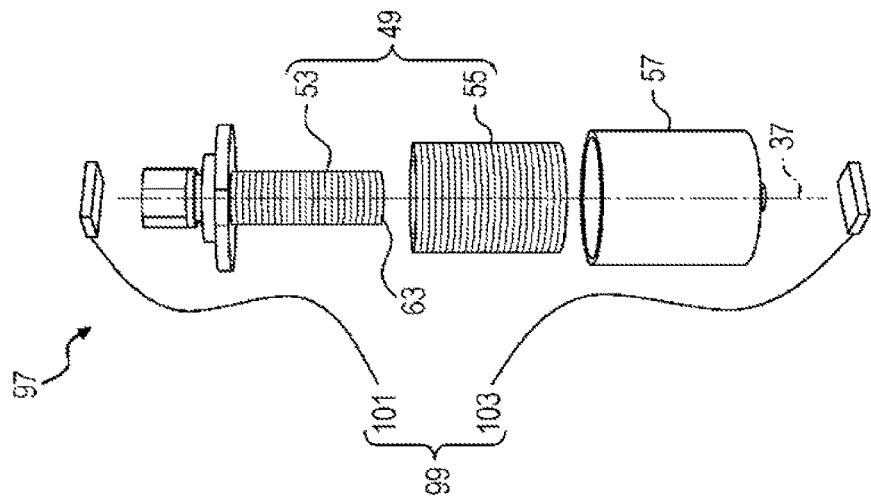
FIG. 5B is an exploded perspective view of a transmission module illustrated in FIG. 5A.
Figure 5A:
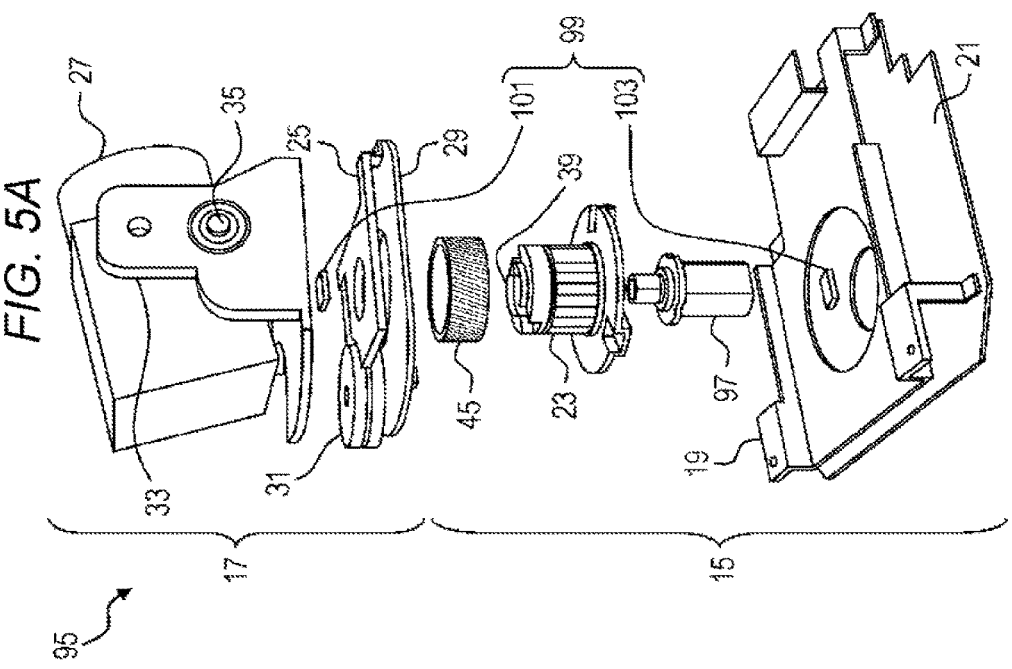
FIG. 5A is an exploded perspective view of a monitoring camera of a second exemplary embodiment.

FIG. 5A is an exploded perspective view of monitoring camera 95 of the second exemplary embodiment. FIG. 5B is an exploded perspective view of transmission module 97 illustrated in FIG. 5A. In the following each exemplary embodiment, the same members and portions as the members and portions illustrated in FIGS. 1 to 3 are given the same reference numerals and duplicate description will be omitted.

In monitoring camera 95 of the second exemplary embodiment, signal transmitter 99 of transmission module 97 includes rotation-side millimeter-wave transmission and reception device 101 that is fixed to rotation unit 17 and is an example of the movable-side high frequency transceiver disposed on one end surface of signal transmission virtual column 64 (see FIG. 10A); and base-side millimeter-wave transmission and reception device 103 that is fixed to base 15 and is an example of the base-side high frequency transceiver that is disposed on the other end surface of signal transmission virtual column 64. In the second exemplary embodiment, base-side millimeter-wave transmission and reception device 103 transmits camera control signal 87 to rotation-side millimeter-wave transmission and reception device 101 using the high frequency (for example, microwave or millimeter wave). However, similar to the first exemplary embodiment, camera control signal 87 may be superimposed on power transmitted from base 15 to rotation unit 17.

According to monitoring camera 95 of the second exemplary embodiment, signal transmitter 99 between rotation unit 17 and base 15 is connected between one set of millimeter wave communication module (specifically, rotation-side millimeter-wave transmission and reception device 101 and base-side millimeter-wave transmission and reception device 103) of which a transmission band is wide wirelessly. Rotation-side millimeter-wave transmission and reception device 101 and base-side millimeter-wave transmission and reception device 103 are disposed to physically face each other on both end surfaces of one end surface and the other end surface of a virtual column. Therefore, in signal transmitter 51, it is possible to stably transmit signals without changing a positional relationship even by the rotation of rotation unit 17.

Modification Example of Second Exemplary Embodiment

Next, monitoring camera 105 of a modification example of the second exemplary embodiment will be described.

FIG. 6A is an exploded perspective view of monitoring camera 105 of the modification example of the second exemplary embodiment. FIG. 6B is an exploded perspective view of transmission module 107 illustrated in FIG. 6A. Monitoring camera 105 of the modification example is provided with waveguide 111 between both end surfaces of signal transmission virtual column 64 in signal transmitter 109 of transmission module 107. More specifically, waveguide 111 is provided so as to be connected between rotation-side millimeter-wave transmission and reception device 101 and power receiving coil 53.

According to monitoring camera 105, the millimeter wave between rotation-side millimeter-wave transmission and reception device 101 and base-side millimeter-wave transmission and reception device 103 is propagated through waveguide 111. For waveguide 111, a hollow waveguide, for example, made of metal is used. Waveguide 111 transmits an electromagnetic wave (microwave) of a microwave band or an electromagnetic wave (millimeter wave) of a millimeter wave band to a hollow portion. The electromagnetic wave is propagated while forming an electromagnetic field in the hollow portion in accordance with a shape, dimensions, a wavelength (frequency). In signal transmitter 109 including waveguide 111, since the shape of the waveguide that is the transmitting path of a signal within waveguide 111 is stable, an impedance thereof is stable.

In monitoring camera 105, the millimeter wave for transmitting signals has a high transmission efficiency and efficient signal transmission can be performed with small power because of being confined within the waveguide. In addition, waveguide 111 suppresses unnecessary radiation to an external device and also reduces adverse effects from an external disturbance radio wave to block the external disturbance radio wave. Therefore, according to monitoring camera 105, it is possible to further stably transmit signals.

Third Exemplary Embodiment

Next, monitoring camera 113 of a third exemplary embodiment will be described.

Figure 7:
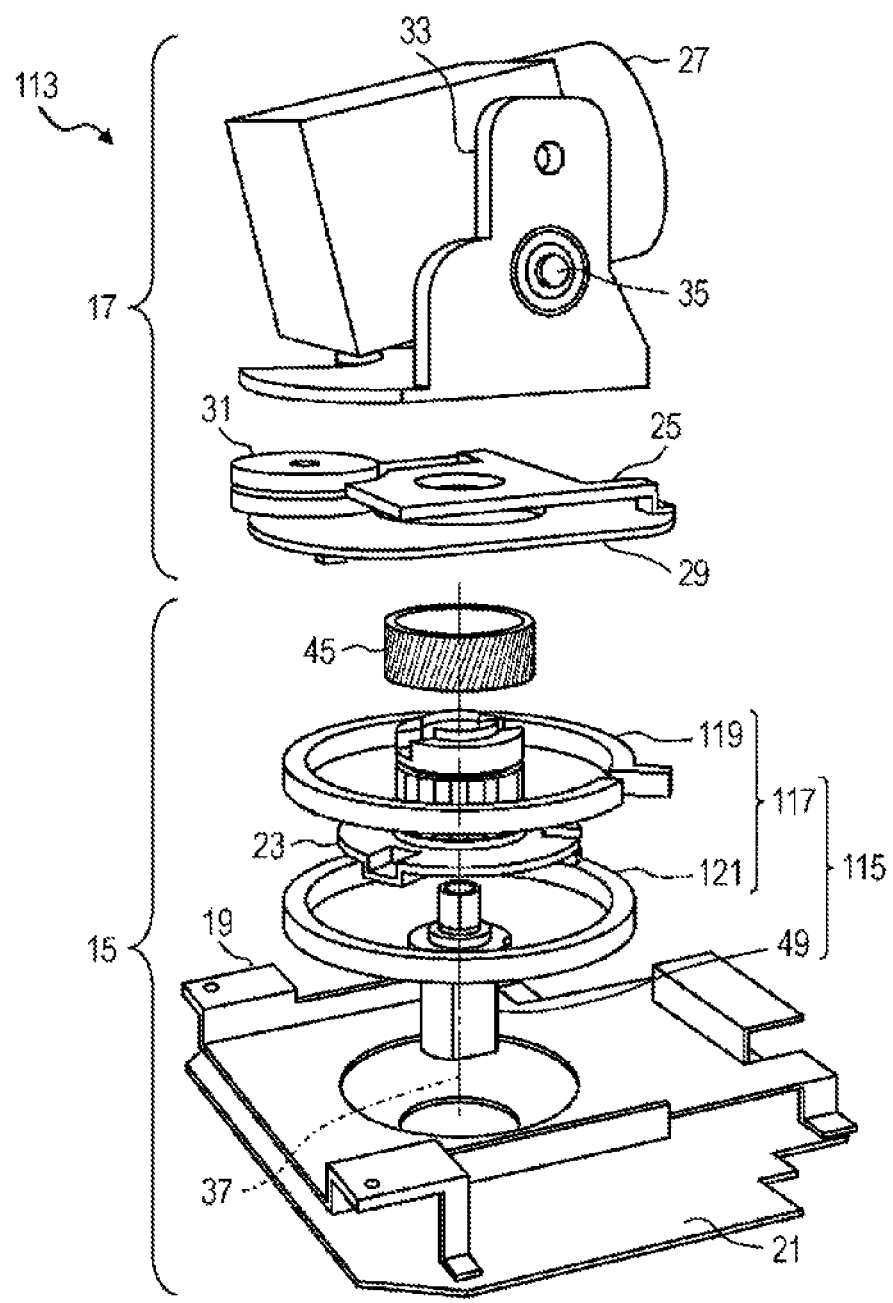
FIG. 7 is an exploded perspective view of a monitoring camera of a third exemplary embodiment.

FIG. 7 is an exploded perspective view of monitoring camera 113 of a third exemplary embodiment. Monitoring camera 113 of the third exemplary embodiment includes power transmitter 49 that causes a transmitting path to be formed between an inner peripheral surface and an outer peripheral surface of power transmission virtual cylinder 62 of which a center axis is axis 37; and signal transmitter 117 that causes a transmitting path to be formed between annular both end surfaces of signal transmission virtual cylinder 116 of which a center axis is axis 37 in transmission module 115.

FIG. 10B is an explanatory view describing the transmission shaft, power transmission virtual cylinder 62, and signal transmission virtual cylinder 116 as an example of the virtual cylinder. In FIG. 10B, in order to facilitate the description of power transmission virtual cylinder 62 and signal transmission virtual cylinder 116, portions that are actually present are indicated by dashed lines and portions that are virtually present are indicated by solid lines.

Monitoring camera 113 is configured such that signal transmitter 117 includes rotation-side slot antenna 119 that is an example of a movable-side annular antenna that is disposed in one annular end of signal transmission virtual cylinder 116 passing through the rotation shaft and is fixed to rotation unit 17; and base-side slot antenna 121 that is an example of a base-side annular antenna that is disposed on the other annular end surface of signal transmission virtual cylinder 116 passing through the rotation shaft and is fixed to base 15.

According to monitoring camera 113, power transmitter 49 causes the transmitting path to be formed between the inner peripheral surface and the outer peripheral surface of power transmission virtual cylinder 62 of which a center axis is axis 37. On the other hand, signal transmitter 117 causes the transmitting path to be formed between both annular end surfaces of power transmission virtual cylinder 62 of which a center axis is axis 37. Power transmission virtual cylinder 62 of power transmitter 49 and signal transmission virtual cylinder 116 of signal transmitter 117 may be the same or may be different. Here, signal transmission virtual cylinder 116 is configured such that the inner peripheral surface and the outer peripheral surface are spaced by a predetermined distance. That is, end surfaces of both end sides of signal transmission virtual cylinder 116 in a direction along axis 37 are respectively annular end surfaces (one annular end surface and the other annular end surface).

Signal transmitter 117 causes the transmitting path to be formed between a part of one annular end surface and the other annular end surface of which the center is axis 37. Therefore, in transmission module 13, signal transmission virtual column 64 (see FIG. 10A) including axis 37 is not used as the transmitting path for the signal transmission. As a result, in fixed shaft 23, it is possible to enhance design flexibility. Also in this case, hollow portion 39 of fixed shaft 23 is required for insertion of power receiving coil 53.

In addition, according to monitoring camera 113, the signal transmission between rotation unit 17 and base 15 is connected in a pair of rotation-side slot antenna 119 and base-side slot antenna 121 of which transmission bands are wide wirelessly. Rotation-side slot antenna 119 and base-side slot antenna 121, of which the center is axis 37 passing through the rotation shaft, are disposed to be spaced in the direction along axis 37. Since signal transmitter 117 is connected to a millimeter wave module by a pair of slot antennas which are disposed close, the signal transmission is stable. In addition, since the slot antenna has a sharp directivity, it is possible to substantially limit radiation and a reception range in the vicinity of a pair of slot antennas. Therefore, it is possible to reduce unnecessary radiation to an external device and adverse effects from an external disturbance radio wave. As a result, it is possible to further stably transmit signals.

In each of monitoring cameras 11, 95, 105, 113 of each exemplary embodiment described above, camera control signal 87 with respect to camera 27 is superimposed on power transmitted from base 15 to rotation unit 17. In monitoring cameras 11, 95, 105, 113, camera control signal 87, which is transmitted from base 15 to rotation unit 17 via each transmission module, is frequency-modulated by frequency modulation circuit 71 of base-side substrate 21 provided in base 15, is superimposed on power of wireless power transmission, and is transmitted to power receiving coil 53 of rotation unit-side substrate 29 provided in rotation unit 17 in a non-contact manner.

Image data 89 of camera 27 is enormous, but the signal transmission from base 15 to camera 27 is small as the degree of the PTZ operation instruction of camera 27 in addition to ACK and operation setting. Thus, in the uplink of transmission modules 13, 97, 107, and 115 described above, the frequency modulation (FSK) for modulating the frequency of wireless power supply is used. On the other hand, in the downlink, high-speed optical data transmission (number) disposed in the rotational center of rotation unit 17 is used. Therefore, it is possible to perform the signal transmission with high speed compared to wireless communication in both directions of the related art using the slip ring.

Figure 8A:
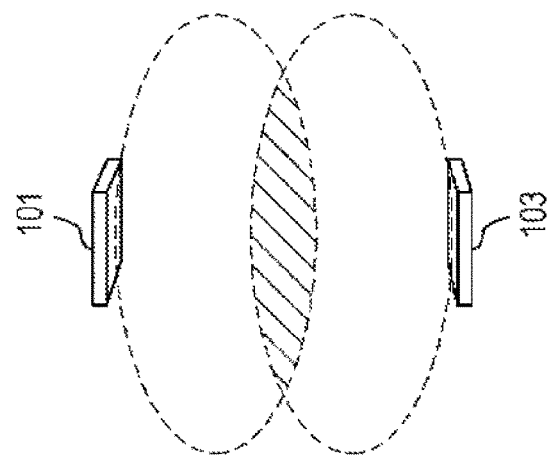
FIG. 8A is an explanatory view of a radiation pattern in which a base-side millimeter-wave transmission and reception device and a rotation-side millimeter-wave transmission and reception device of non-directivity are disposed.
Figure 8B:
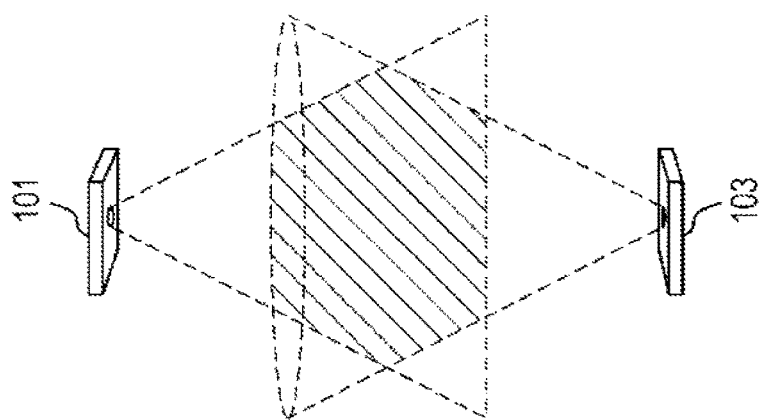
FIG. 8B is an explanatory view of a radiation pattern in which a base-side millimeter-wave transmission and reception device and a rotation-side millimeter-wave transmission and reception device of directivity are disposed.
Figure 8C:
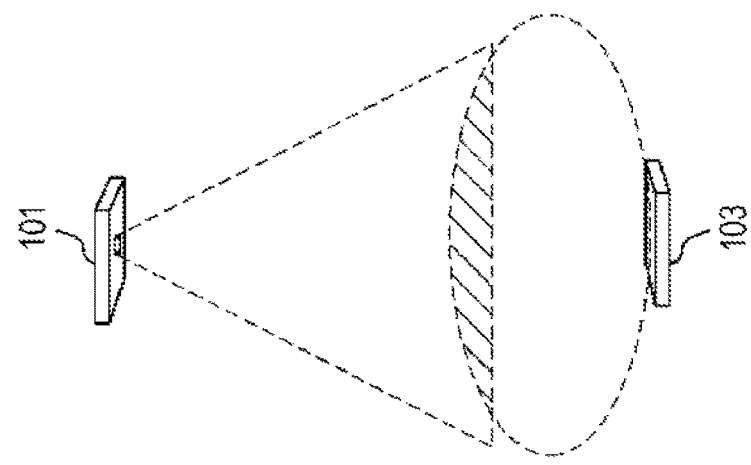
FIG. 8C is an explanatory view of a radiation pattern in which a base-side millimeter-wave transmission and reception device of non-directivity and a rotation-side millimeter-wave transmission and reception device of directivity are disposed.

FIG. 8A is an explanatory view of a radiation pattern in which base-side millimeter-wave transmission and reception device 103 and rotation-side millimeter-wave transmission and reception device 101 of non-directivity are disposed. FIG. 8B is an explanatory view of a radiation pattern in which base-side millimeter-wave transmission and reception device 103 and rotation-side millimeter-wave transmission and reception device 101 of directivity are disposed. FIG. 8C is an explanatory view of a radiation pattern in which base-side millimeter-wave transmission and reception device 103 of non-directivity and rotation-side millimeter-wave transmission and reception device 101 of directivity are disposed.

Rotation-side millimeter-wave transmission and reception device 101 and base-side millimeter-wave transmission and reception device 103 can set the radiation pattern of the radio wave to the non-directivity or the directivity by a design of the antenna. The radiation pattern of the non-directivity illustrated in FIG. 8A can have a large allowable range of an antenna disposition, but energy efficiency is low. On the other hand, the radiation pattern of the directivity illustrated in FIG. 8B has a narrow allowable range of an antenna disposition, but energy efficiency is high. Then, as illustrated in FIG. 8C, in monitoring camera 95, rotation-side millimeter-wave transmission and reception device 101 has the radiation pattern of the directivity and base-side millimeter-wave transmission and reception device 103 has the radiation pattern of the non-directivity. Therefore, monitoring camera 95 uses the directivity as the radiation pattern of the radio wave in one antenna of rotation-side millimeter-wave transmission and reception device 101 and base-side millimeter-wave transmission and reception device 103 while taking a large allowable range of the antenna disposition, and thereby it is possible to suppress reduction of energy efficiency.

Therefore, in monitoring camera 95 of the second exemplary embodiment described above, it is preferable that rotation-side millimeter-wave transmission and reception device 101 has the directivity and base-side millimeter-wave transmission and reception device 103 has the non-directivity.

FIG. 9A is an explanatory view illustrating a further modification example in which rotation-side millimeter-wave transmission and reception device 101 of directivity is shifted from a rotational center. FIG. 9B is an explanatory view of an operation of FIG. 9A.

In a case where base-side millimeter-wave transmission and reception device 103 is disposed on the axis passing through the rotational center, as illustrated in FIG. 9A, rotation-side millimeter-wave transmission and reception device 101 can be disposed to be shifted from axis 37 passing through the rotational center. In this case, base-side millimeter-wave transmission and reception device 103 has the non-directivity and rotation-side millimeter-wave transmission and reception device 101 has the directivity. For example, rotation-side millimeter-wave transmission and reception device 101 having the directivity with radio wave intensity in a specific direction is disposed to be shifted from axis 37 and thereby, as illustrated in FIG. 9B, even if rotation-side millimeter-wave transmission and reception device 101 and base-side millimeter-wave transmission and reception device 103 are relatively rotated, it is possible to perform stable communication. That is, rotation-side millimeter-wave transmission and reception device 101 is disposed to be inclined with respect to the inside (axis 37) and has the directivity with respect to axis 37. Thus, even if rotation-side millimeter-wave transmission and reception device 101 is rotated, it is possible to direct the directivity to base-side millimeter-wave transmission and reception device 103 positioned on axis 37. Therefore, even if rotation-side millimeter-wave transmission and reception device 101 is rotated with respect to base-side millimeter-wave transmission and reception device 103, it is possible to continue stable communication. However, it is not essential to dispose rotation-side millimeter-wave transmission and reception device 101 to be inclined.

According to the disposition configuration described above, since rotation-side millimeter-wave transmission and reception device 101 can be disposed in a portion other than the axis, it is possible to enhance a degree of freedom of a design of fixed shaft 23 and a peripheral structure of the fixed shaft.

Finally, configurations, operations, and effects of the imaging apparatus of the disclosure will be described.

An exemplary embodiment of the disclosure is an imaging apparatus including a base that has a power transmitter for transmitting power wirelessly; and a movable unit that has a power receiver for receiving power wirelessly from the power transmitter, an imager operating on the basis of power received by the power receiver, and a first communicator transmitting image information acquired by the imager wirelessly. The movable unit is movable relative to the base.

According to the imaging apparatus, that is, it is possible to transmit the signal and power between the base and the movable unit in a non-contact manner wirelessly. In addition, the imaging apparatus receives power transmitted from the base in the movable unit and actuates the imager on the basis of the received power. Therefore, there is no need to accurately fix a plurality of rotation terminals including smooth electric contact surfaces having a wear resistance along the rotation shaft unlike the slip ring of the related art. In addition, a complex structure including a number of mechanical contacts is no longer needed and there is no limit in the number of operation times (pans).

In addition, an exemplary embodiment of the disclosure is the imaging apparatus in which the imager has a configuration to which power received by the power receiver is supplied via a cable and which is movable relative to the base in conjunction with the power receiver.

According to the imaging apparatus, power received by the power receiver is supplied to the imager via the cable and thereby the imager can be operated by power transmitted in a non-contact manner as a power source without requiring an external power source.

In addition, an exemplary embodiment of the disclosure is the imaging apparatus in which the base further includes a second communicator that receives the image information from the first communicator wirelessly, and in which a relative positional relationship between the first communicator and the second communicator is substantially maintained even in a case where the movable unit is moved.

According to the imaging apparatus, the second communicator, in which the base receives the image information (for example, image data 89) transmitted from the first communicator wirelessly, is provided. Even if the movable unit is movable (for example, rotation) relative to the base, the relative positional relationship between the first communicator and the second communicator can be substantially maintained.

In addition, an exemplary embodiment of the disclosure is the imaging apparatus in which the base further includes a second communicator for receiving the image information from the first communicator wirelessly, and in which a distance between the first communicator and the second communicator is substantially maintained even in a case where the movable unit is movable.

According to the imaging apparatus, the second communicator, in which the base receives the image information (for example, image data 89) transmitted from the first communicator wirelessly, is provided. Even if the movable unit is moved (such as a rotation operation) relative to the base, the relative distance between the first communicator and the second communicator can be substantially maintained.

In addition, an exemplary embodiment of the disclosure is the imaging apparatus in which the movable unit is rotated relative to the base around the rotation shaft, and in which at least one of the first communicator and the second communicator is disposed on the rotation shaft.

According to the imaging apparatus, the movable unit is rotated relative to the base around the rotation shaft and at least one of the first communicator and the second communicator is disposed on the rotation shaft. Therefore, if the directivity in the communication is directed on the rotation shaft, it is possible to continue stable communication even in a case where the other thereof is not disposed on the rotation shaft.

In addition, an exemplary embodiment of the disclosure is the imaging apparatus in which the first communicator and the second communicator are disposed on the rotation shaft.

According to the imaging apparatus, both the first communicator and the second communicator are disposed on the rotation shaft. Therefore, the directivities in the communication face each other and thereby it is possible to continue stable communication.

In addition, an exemplary embodiment of the disclosure is the imaging apparatus in which the power transmitter is a power transmission coil in which a conductive wire is wound around the rotation shaft and the power receiver is a power receiving coil in which a conductive wire is wound around the rotation shaft, and in which the first communicator transmits the image information to the second communicator using a hollow of the conductive wire wound around the rotation shaft as a transmitting path.

According to the imaging apparatus, the power transmitter and the power receiver are configured of the power transmission coil and the power receiving coil in which the conductive wires are respectively wound around the rotation shaft of the movable unit with respect to the base. Therefore, the first communicator can transmit the image information with respect to the second communicator at high speed using the hollow portion of the wound conductive wires as the transmitting path.

In addition, an exemplary embodiment of the disclosure is the imaging apparatus in which the base includes a superimposing unit that superimposes control information for controlling the imager on power transmitted by the power transmitter.

According to the imaging apparatus, the superimposing unit, which superimposes the control information (for example, camera control signal 87) for controlling the imager on power, is provided in the base. Therefore, even in a case where it is difficult to perform communication in both directions, it is possible to substantially perform communication in both directions by superimposing a signal on power during power transmission.

In addition, an exemplary embodiment of the disclosure is the imaging apparatus in which the second communicator transmits the control information for controlling the imager to the first communicator wirelessly.

According to the imaging apparatus, the second communicator transmits the control information (for example, camera control signal 87) for controlling the imager to the first communicator wirelessly. Therefore, it is possible to perform communication in both directions between the first communicator and the second communicator.

In addition, an exemplary embodiment of the disclosure is the imaging apparatus in which the first communicator has an optical transmitter for transmitting data including an image captured by the imager by optical communication, and in which the second communicator has an optical receiver for receiving data including the image transmitted by the optical transmitter by the optical communication.

According to the imaging apparatus, the first communicator (for example, optical transmitter 59) is fixed to the movable unit. In addition, the second communicator (for example, optical receiver 61) is fixed to the base. The hollow portion of the power transmitter and the power receiver is provided in the transmitting path between the first communicator and the second communicator. That is, since the transmitting path is hollow, a portion interfering the optical communication is not present between the first communicator and the second communicator, and it is possible to use the optical communication at high speed in the signal transmission (downlink) from the imager to the base.

In addition, an exemplary embodiment of the disclosure is the imaging apparatus in which the first communicator has a movable-side high frequency transceiver for transmitting data including an image captured by the imager using the high frequency, and in which the second communicator has a base-side high frequency transceiver for receiving data including the image transmitted by the movable-side high frequency transceiver.

According to the imaging apparatus, the signal transmission between the rotation unit and the base is connected in a pair of high frequency transceivers (movable-side high frequency transmission and reception device and base-since high frequency transmission and reception device) of which a transmission band is wide wirelessly. The movable-side high frequency transmission and reception device and the base-since high frequency transmission and reception device are disposed to face both end surfaces of one end surface and the other end surface of a virtual column. Therefore, the first communicator and the second communicator can perform stable signal transmission without changing a positional relationship even by the rotation of the rotation unit.

In addition, an exemplary embodiment of the disclosure is the imaging apparatus in which the waveguide is provided between the movable-side high frequency transceiver and the power receiver.

According to the imaging apparatus, the waveguide transmits an electromagnetic wave from a microwave band to a millimeter wave band to the hollow portion. The electromagnetic wave is propagated which forming an electromagnetic field in accordance with a shape, a dimension, and a wavelength (frequency) in the hollow portion. Since the waveguide is stable in shape, an impedance is stable.

In addition, an exemplary embodiment of the disclosure is the imaging apparatus in which the first communicator has a movable-side annular antenna for transmitting data including an image captured by the imager via an annular antenna, and in which the second communicator has a base-side annular antenna for receiving data including the image transmitted by the movable-side annular antenna via an annular antenna.

According to the imaging apparatus, the power transmitter and the power receiver cause the transmitting path to be formed between the inner peripheral surface and the outer peripheral surface of the virtual cylinder of which a center axis is axis 37. On the other hand, the first communicator and the second communicator cause the transmitting path to be formed between both annular end surfaces of the virtual cylinder of which a center axis is axis 37. The first communicator and the second communicator cause the transmitting path to be formed between a pair of one annular end surface and the other annular end surface of which a center axis is axis 37. Therefore, the virtual column including axis 37 is not used as the transmitting path for the signal transmission. As a result, according to the imaging apparatus, it is possible to enhance a degree of freedom of a design of the rotation shaft (for example, fixed shaft 23) for rotating the imager with respect to the base.

In addition, according to the imaging apparatus, the signal transmission between the rotation unit and the base is connected in a pair of the movable-side annular antenna and the base-side annular antenna of which a transmission band is wide wirelessly. The movable-side annular antenna and the base-side annular antenna are disposed to be spaced in a direction along axis 37 around axis 37. Since the first communicator and the second communicator are connected to a pair of slot antennas, the signal transmission is stable.

In addition, an exemplary embodiment of the disclosure is the imaging apparatus in which the movable-side high frequency transceiver has directivity in a predetermined direction, and in which the base-side high frequency transceiver has non-directivity.

According to the imaging apparatus, the movable-side high frequency transceiver has the directivity in the radiation pattern and the base-side high frequency transceiver has the non-directivity in the radiation pattern. Therefore, the directivity is used as the radiation pattern of the radio wave in one antenna of movable-side high frequency transceiver and the base-side high frequency transceiver while taking a large allowable range of the antenna disposition, and thereby it is possible to suppress reduction of energy efficiency.

In addition, an exemplary embodiment of the disclosure is the imaging apparatus in which a fixed shaft (fixed shaft 23) corresponding to the rotation shaft (for example, axis 37) of the movable unit with respect to the base is fixed to the base, in which the movement of the fixed shaft in the direction along the axis is regulated, and in which the camera bracket of the movable unit is rotatably supported on the fixed shaft. Furthermore, a worm wheel is coaxially fixed to an outer periphery of the fixed shaft, in which a motor is fixed to the camera bracket, and in which a worm gear meshing with the worm wheel is fixed to a driving shaft of the motor.

According to the imaging apparatus, in the imaging apparatus, it is possible to pan the camera bracket integrally fixed to the motor around the fixed shaft and to rotate the movable unit including the imager with respect to the base.

Various exemplary embodiments are described above with reference to the accompanying drawings, but it goes without saying that the disclosure is not limited to the examples. It is clear that those skilled in the art may conceive various modification examples or correction examples within the scope described in the claims and it should be understood that such modification examples and correction examples also fall within the technical scope of the disclosure.

INDUSTRIAL APPLICABILITY

This disclosure is useful as a calibration apparatus and a calibration method in which carrier leak occurring in DC modulation of a high frequency signal is suppressed and the high frequency signal having desired power is obtained.

REFERENCE MARKS IN THE DRAWINGS

11 monitoring camera
13 transmission module
15 base
17 rotation unit
19 base bracket
21 base-side substrate
23 fixed shaft
25 camera bracket
27 camera
29 rotation unit-side substrate
31 motor
33 camera arm
35 arm spindle
37 axis
39 hollow portion
41 circumferential groove
43 engaging piece
45 worm wheel
47 worm gear
49 power transmitter
51 signal transmitter
53 power receiving coil
55 power transmission coil
59 optical transmitter
61 optical receiver
62 power transmission virtual cylinder
63 hollow portion
64 signal transmission virtual column
65 monitoring room
67 computer
69 inverter
71 frequency modulation circuit
73 optical signal demodulation circuit
75 image signal processing circuit
77 signal separator
79 rectifier circuit
81 demodulation circuit
83 camera control circuit
85 optical modulator
87 camera control signal
89 image data
91 imaging signal
93 monitor screen
95 monitoring camera
97 transmission module
99 signal transmitter
101 rotation-side millimeter-wave transmission and reception device
103 base-side millimeter-wave transmission and reception device 105 monitoring camera
107 transmission module
109 signal transmitter
111 waveguide
113 monitoring camera
115 transmission module
116 signal transmission virtual cylinder
117 signal transmitter
119 rotation-side slot antenna
121 base-side slot antenna

The invention claimed is:

1. An imaging apparatus comprising:
a base that has a power transmitter for transmitting power wirelessly; and
a movable unit that has a power receiver for receiving power wirelessly from the power transmitter, an imager operating on the basis of power received by the power receiver, and a first communicator for transmitting wirelessly image information acquired by the imager,
wherein the base includes a second communicator for receiving wirelessly the image information from the first communicator of the movable unit,
wherein the movable unit is movable relative to the base around a rotation axis, and
wherein at least one of the first communicator and the second communicator is disposed on the rotation axis.

2. The imaging apparatus of claim 1,
wherein the imager has a configuration in which power received by the power receiver is supplied via a cable and which is movable relative to the base in conjunction with the power receiver.

3. The imaging apparatus of claim 1,
wherein a relative positional relationship between the first communicator and the second communicator is configured to be substantially maintained even in a case where the movable unit is moved.

4. The imaging apparatus of claim 1,
wherein a distance between the first communicator and the second communicator is configured to be substantially maintained even in a case where the movable unit is moved.

5. The imaging apparatus of claim 1, wherein the first communicator and the second communicator are disposed on the rotation axis.

6. The imaging apparatus of claim 5,
wherein the power transmitter of the base is a power transmission coil in which a conductive wire is wound around the rotation axis and the power receiver of the movable unit is a power receiving coil in which a conductive wire is wound around the rotation axis, and
wherein the first communicator transmits the image information to the second communicator using a hollow of the conductive wire wound around the rotation axis as a transmitting path.

7. The imaging apparatus of claim 1,
wherein the base includes a superimposing unit that superimposes control information for controlling the imager on power transmitted by the power transmitter.

8. The imaging apparatus of claim 1,
wherein the second communicator wirelessly transmits control information for controlling the imager to the first communicator.

9. The imaging apparatus of claim 1,
wherein the first communicator has an optical transmitter for transmitting data including an image captured by the imager by optical communication, and
wherein the second communicator has an optical receiver for receiving data including the image transmitted by the optical transmitter via optical communication.

10. The imaging apparatus of claim 1,
wherein the first communicator has a movable-side high frequency transceiver for transmitting data including an image captured by the imager using the high frequency, and
wherein the second communicator has a base-side high frequency transceiver for receiving data including the image transmitted by the movable-side high frequency transceiver using the high frequency.

11. The imaging apparatus of claim 10, further comprising a waveguide provided between the movable-side high frequency transceiver and the power receiver.

12. The imaging apparatus of claim 1,
wherein the first communicator has a movable-side annular antenna for transmitting data including an image captured by the imager via an annular antenna, and
wherein the second communicator has a base-side annular antenna for receiving data including the image transmitted by the movable-side annular antenna via an annular antenna.

13. The imaging apparatus of claim 10,
wherein the movable-side high frequency transceiver has directivity in a predetermined direction, and
wherein the base-side high frequency transceiver has non-directivity.

14. The imaging apparatus of claim 1, further comprising:
a fixed shaft fixed to the base, the fixed shaft rotatably supporting the movable unit;
a worm wheel coaxially fixed to an outer periphery of the fixed shaft;
a motor including a driving shaft; and
a worm gear fixed to the driving shaft of the motor and meshing with the worm wheel, wherein the movable unit has a camera bracket which is rotatable around the fixed shaft and of which a movement in a direction along an axis of the fixed shaft is regulated, and
wherein the motor is fixed to the camera bracket.

* * * * *